US011887158B2

(12) United States Patent
Evans et al.

(10) Patent No.: US 11,887,158 B2
(45) Date of Patent: *Jan. 30, 2024

(54) SYSTEM AND METHOD FOR TARGETING ADVERTISEMENTS

(71) Applicant: Zeta Global Corp., New York, NY (US)

(72) Inventors: Justin Evans, New York, NY (US); Tyler Liebowitz, New York, NY (US)

(73) Assignee: Zeta Global Corp., New York, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/538,607

(22) Filed: Nov. 30, 2021

(65) Prior Publication Data

US 2022/0084068 A1 Mar. 17, 2022

Related U.S. Application Data

(63) Continuation of application No. 15/642,536, filed on Jul. 6, 2017, now Pat. No. 11,270,341, which is a continuation of application No. 13/535,985, filed on Jun. 28, 2012, now abandoned.

(60) Provisional application No. 61/534,506, filed on Sep. 14, 2011.

(51) Int. Cl.
*G06Q 30/02* (2023.01)
*G06Q 30/0251* (2023.01)

(52) U.S. Cl.
CPC .............................. *G06Q 30/0255* (2013.01)

(58) Field of Classification Search
None
See application file for complete search history.

(56) References Cited

U.S. PATENT DOCUMENTS

| 6,718,551 | B1 | 4/2004 | Swix et al. |
| 7,949,565 | B1 | 5/2011 | Eldering et al. |
| 8,000,993 | B2 | 8/2011 | Harvey et al. |
| 8,060,398 | B2 | 11/2011 | Canning et al. |
| 8,745,647 | B1 | 6/2014 | Shin et al. |
| 8,751,461 | B2 | 6/2014 | Abraham et al. |
| 8,935,797 | B1 * | 1/2015 | Silver ................. G06F 21/6254 726/26 |
| 9,098,857 | B1 | 8/2015 | Brown et al. |

(Continued)

FOREIGN PATENT DOCUMENTS

WO  WO-2008092145 A9  9/2008
WO  WO-2013039594 A1  3/2013

OTHER PUBLICATIONS

"Advertisement System, Method And Computer Program Product", An IP.com Prior Art Database Technical Disclosure, IPCOM000138557D, (Jul. 24, 2006).

(Continued)

*Primary Examiner* — David J Stoltenberg
(74) *Attorney, Agent, or Firm* — Schwegman Lundberg & Woessner, P.A.

(57) ABSTRACT

Methods and systems for performing targeted advertising are described. Relative concentration of consumer types in the audience of particular media content is determined by measuring the coincidence of key values identifying certain consumer types, and other key values identifying audiences of particular media content, in a database.

12 Claims, 3 Drawing Sheets

(56) References Cited

U.S. PATENT DOCUMENTS

| | | | |
|---|---|---|---|
| 9,536,000 B2* | 1/2017 | Ramaiyer | G06Q 30/0269 |
| 9,918,142 B2 | 3/2018 | Kitts et al. | |
| 10,223,701 B2 | 3/2019 | King et al. | |
| 11,270,341 B2 | 3/2022 | Evans et al. | |
| 2001/0020236 A1* | 9/2001 | Cannon | G06Q 30/02 |
| 2002/0010620 A1 | 1/2002 | Kowalchuk et al. | |
| 2002/0178445 A1 | 11/2002 | Eldering et al. | |
| 2003/0145323 A1 | 7/2003 | Hendricks et al. | |
| 2004/0015715 A1 | 1/2004 | Brown | |
| 2005/0021397 A1 | 1/2005 | Cui et al. | |
| 2005/0165644 A1* | 7/2005 | Beyda | G06Q 30/0277 |
| | | | 705/14.69 |
| 2006/0074752 A1 | 4/2006 | Newmark | |
| 2007/0067297 A1 | 3/2007 | Kublickis | |
| 2007/0180469 A1 | 8/2007 | Finley et al. | |
| 2007/0204292 A1 | 8/2007 | Riedl et al. | |
| 2007/0276940 A1 | 11/2007 | Abraham et al. | |
| 2008/0010142 A1 | 1/2008 | O'Brien et al. | |
| 2008/0040224 A1 | 2/2008 | Roker | |
| 2008/0091513 A1 | 4/2008 | Waggoner | |
| 2008/0120165 A1 | 5/2008 | Yan | |
| 2008/0133342 A1* | 6/2008 | Criou | G06Q 30/02 |
| | | | 705/14.54 |
| 2008/0183573 A1 | 7/2008 | Muschetto | |
| 2008/0259906 A1 | 10/2008 | Shkedi | |
| 2008/0270417 A1 | 10/2008 | Roker | |
| 2008/0300894 A1 | 12/2008 | John | |
| 2009/0049469 A1 | 2/2009 | Small et al. | |
| 2009/0112703 A1 | 4/2009 | Brown | |
| 2009/0144129 A1 | 6/2009 | Grouf et al. | |
| 2009/0150215 A1 | 6/2009 | Kalb et al. | |
| 2009/0172728 A1 | 7/2009 | Shkedi et al. | |
| 2009/0228340 A1 | 9/2009 | Bohannon | |
| 2009/0259518 A1 | 10/2009 | Harvey et al. | |
| 2009/0292587 A1 | 11/2009 | Fitzgerald | |
| 2009/0319365 A1 | 12/2009 | Waggoner et al. | |
| 2009/0327030 A1* | 12/2009 | Collins | G06Q 30/02 |
| | | | 705/14.43 |
| 2010/0030647 A1 | 2/2010 | Shahshahani | |
| 2010/0058375 A1 | 3/2010 | Lafreniere et al. | |
| 2010/0115060 A1 | 5/2010 | Julia et al. | |
| 2010/0131363 A1 | 5/2010 | Sievert et al. | |
| 2010/0161492 A1 | 6/2010 | Harvey et al. | |
| 2010/0185517 A1 | 7/2010 | Higgins et al. | |
| 2010/0199356 A1* | 8/2010 | Krishnamurthy | G06Q 30/0269 |
| | | | 726/26 |
| 2010/0228595 A1 | 9/2010 | Dempster et al. | |
| 2010/0228629 A1 | 9/2010 | Harrison et al. | |
| 2010/0332304 A1 | 12/2010 | Higgins et al. | |
| 2011/0055009 A1* | 3/2011 | Kiveris | G06Q 30/0201 |
| | | | 706/54 |
| 2011/0106829 A1 | 5/2011 | Pradhan et al. | |
| 2011/0119126 A1 | 5/2011 | Park et al. | |
| 2011/0119278 A1 | 5/2011 | Hunn et al. | |
| 2011/0161165 A1 | 6/2011 | Gierkink et al. | |
| 2011/0231246 A1 | 9/2011 | Bhatia et al. | |
| 2011/0231305 A1 | 9/2011 | Winters | |
| 2011/0246267 A1 | 10/2011 | Williams et al. | |
| 2011/0246300 A1 | 10/2011 | Yarvis et al. | |
| 2011/0246511 A1 | 10/2011 | Smith et al. | |
| 2011/0258049 A1 | 10/2011 | Ramer et al. | |
| 2011/0276411 A1 | 11/2011 | Mcelfresh et al. | |
| 2011/0288907 A1* | 11/2011 | Harvey | G06Q 10/0639 |
| | | | 705/7.29 |
| 2011/0288911 A1 | 11/2011 | Barnes, Jr. | |
| 2011/0313864 A1 | 12/2011 | Eldering et al. | |
| 2012/0066065 A1 | 3/2012 | Switzer | |
| 2012/0072469 A1 | 3/2012 | Perez et al. | |
| 2012/0130802 A1 | 5/2012 | Shimizu | |
| 2012/0150641 A1* | 6/2012 | Dobbs | G06Q 30/02 |
| | | | 705/14.53 |
| 2013/0006706 A1 | 1/2013 | Harvey et al. | |
| 2013/0021345 A1* | 1/2013 | Hsiao | G06Q 30/0241 |
| | | | 345/440.2 |
| 2013/0066724 A1 | 3/2013 | Evans et al. | |
| 2014/0101686 A1 | 4/2014 | Kitts et al. | |
| 2015/0095145 A1* | 4/2015 | Shulman | G06F 16/9535 |
| | | | 705/14.62 |
| 2015/0154632 A1 | 6/2015 | Jindal et al. | |
| 2015/0213484 A1 | 7/2015 | Amara et al. | |
| 2017/0208370 A1 | 7/2017 | Ray et al. | |
| 2018/0130093 A1 | 5/2018 | Evans et al. | |

OTHER PUBLICATIONS

"U.S. Appl. No. 13/535,985, Final Office Action dated Jun. 29, 2015", 10 pgs.

"U.S. Appl. No. 13/535,985, Non Final Office Action dated Jun. 4, 2014", 21 pgs.

"U.S. Appl. No. 13/535,985, Non Final Office Action dated Jun. 8, 2016", 8 pgs.

"U.S. Appl. No. 13/535,985, Non Final Office Action dated Dec. 12, 2014", 18 pgs.

"U.S. Appl. No. 13/535,985, Response filed Mar. 12, 2015 to Non Final Office Action dated Dec. 12, 2014", 12 pgs.

"U.S. Appl. No. 13/535,985, Response filed Sep. 4, 2014 to Non Final Office Action dated Jun. 4, 2014", 9 pgs.

"U.S. Appl. No. 13/535,985, Response filed Sep. 29, 2015 to Final Office Action dated Jun. 29, 2015", 4 pgs.

"U.S. Appl. No. 15/642,536, 312 Amendment filed Jan. 27, 2022", 9 pgs.

"U.S. Appl. No. 15/642,536, Advisory Action dated Apr. 29, 2020", 3 pgs.

"U.S. Appl. No. 15/642,536, Examiner Interview Summary dated Nov. 21, 2019", 3 pgs.

"U.S. Appl. No. 15/642,536, Final Office Action dated Feb. 13, 2020", 22 pgs.

"U.S. Appl. No. 15/642,536, Final Office Action dated May 9, 2019", 14 pgs.

"U.S. Appl. No. 15/642,536, Final Office Action dated Nov. 24, 2020", 25 pgs.

"U.S. Appl. No. 15/642,536, Non Final Office Action dated May 28, 2020", 23 pgs.

"U.S. Appl. No. 15/642,536, Non Final Office Action dated Jun. 3, 2021", 13 pgs.

"U.S. Appl. No. 15/642,536, Non Final Office Action dated Oct. 16, 2019", 23 pgs.

"U.S. Appl. No. 15/642,536, Non Final Office Action dated Dec. 27, 2018", 12 pgs.

"U.S. Appl. No. 15/642,536, Notice of Allowance dated Oct. 27, 2021", 12 pgs.

"U.S. Appl. No. 15/642,536, Preliminary Amendment filed Jul. 6, 2017", 3 pgs.

"U.S. Appl. No. 15/642,536, PTO Response to Rule 312 Communication dated Feb. 9, 2022", 2 pgs.

"U.S. Appl. No. 15/642,536, Response filed Jan. 15, 2020 to Non Final Office Action dated Oct. 16, 2019", 13 pgs.

"U.S. Appl. No. 15/642,536, Response filed Mar. 27, 2019 to Non Final Office Action dated Dec. 27, 2018", 13 pgs.

"U.S. Appl. No. 15/642,536, Response filed Sep. 30, 2021 to Non Final Office Action dated Jun. 3, 2021", 10 pgs.

"U.S. Appl. No. 15/642,536, Response filed May 24, 2021 to Final Office Action dated Nov. 24, 2020", 10 pgs.

"U.S. Appl. No. 15/642,536, Response filed Sep. 6, 2019 to Final Office Action dated May 9, 2019", 18 pgs.

"International Application Serial No. PCT/US2012/032539, International Search Report dated Jul. 6, 2012", 2 pgs.

"International Application Serial No. PCT/US2012/044571, International Preliminary Report on Patentability dated Mar. 27, 2014", 7 pgs.

"International Application Serial No. PCT/US2012/044571, International Search Report dated Sep. 11, 2012", 2 pgs.

"International Application Serial No. PCT/US2012/044571, Written Opinion dated Sep. 11, 2012", 5 pgs.

Kim, et al., "Design for an Interactive Television Advertising System", Proceedings of the 39th Hawaii International Conference on System Sciences, (2006).

(56) References Cited

OTHER PUBLICATIONS

U.S. Appl. No. 13/535,985, filed Jun. 28, 2012, System and Method for Targeting Advertisements.
U.S. Appl. No. 15/642,536 U.S. Pat. No. 11,270,341, Jul. 6, 2017, System and Method for Targeting Advertisements.

* cited by examiner

SYSTEM AND METHOD FOR TARGETING ADVERTISEMENTS

CROSS REFERENCE TO RELATED APPLICATIONS

This application is a continuation of U.S. patent application Ser. No. 15/642,536, filed Jul. 6, 2017, which is a continuation of U.S. patent application Ser. No. 13/535,985, filed Jun. 28, 2012, which claims priority to U.S. Provisional Patent Application No. 61/534,506, filed Sep. 14, 2011, the entireties of which are incorporated herein by reference.

FIELD OF THE INVENTION

The systems and methods described herein relate to targeting advertising.

SUMMARY OF EMBODIMENTS OF THE INVENTION

The present invention is directed to systems, methods and computer-readable media in which targeted advertising is achieved. In particular, target characteristic data describing consumer characteristics targeted by an advertiser is received. A first set of Internet user keys associated with users exhibiting the target characteristic data is determined using one or more databases that store data describing a plurality of user keys and the target characteristic data associated with each of the plurality of user keys, A first count of Internet users included in the first set is determined. A second count of a total number of Internet users whose data is contained in. the one or more databases is determined. A media target list is deter ruined. The media target list includes a second set of Internet user keys associated with Internet users exhibiting a media consuming behavior. A third count of Internet users included in the second set is determined. The Internet user keys in the first set that match the Internet user keys in the second set are identified. A fourth count of the number of Internet user keys in the first set that match the Internet user keys in the second set is determined. An index is determined, based on the aforementioned counts, that is used to measure the incidence of the target characteristic in the media target list relative to the incidence of the target characteristic among Internet users whose data is contained in the one or more databases.

While the exemplary embodiments described herein relate to targeting television advertisements, the invention is not so limited. Indeed, the present invention is applicable more broadly to targeting advertising to consumers of media in other, non-Internet, environments, including radio and print. The invention is also applicable in connection with advertising directed to consumers of media in certain types of Internet-based environments, such as online radio, online video, and other online and mobile content programming.

DETAILED DESCRIPTION

Advertisers, including television advertisers, often wish to purchase advertising associated with certain content (e.g., TV programs) that attract the highest concentration of their target audiences, relative to other content. Traditionally, intelligence about the relative concentration of any audience type is provided by media measurement services that retrieve information about the media consumption (e.g., TV viewing) of an individual or in a household (e.g., obtained through a diary, survey, set-top box, or metering technology), and then analyze the characteristics of the individual or members of that household—gathered through questionnaire responses by the individuals or members of that household, or through database matches between a consumer information database and the personally identifying information (i.e., PII) of the individuals or members of that household whose behavior is being measured—linked to the media consuming behavior, in order to offer commercially valuable insights about audiences of particular content (e.g., TV shows).

The methods and systems described herein involve determining the relative concentration of consumer types in the audience of particular media content by measuring the coincidence of key values identifying certain consumer types, and other key values identifying audiences of particular media content, in a database. In addition to offering relatively standard metrics of consumer behavior (e.g., demographic characteristics, purchase behaviors) linked to media content, this method provides the advertiser with intelligence on consumer types who are defined by behaviors observable online—such as social media activity, visitation to a particular website (for instance, the advertiser's website or a promotional site of their choosing), and/or browsing behaviors that indicate that the consumer is "in-market" for a particular product or service.

Figure 1:
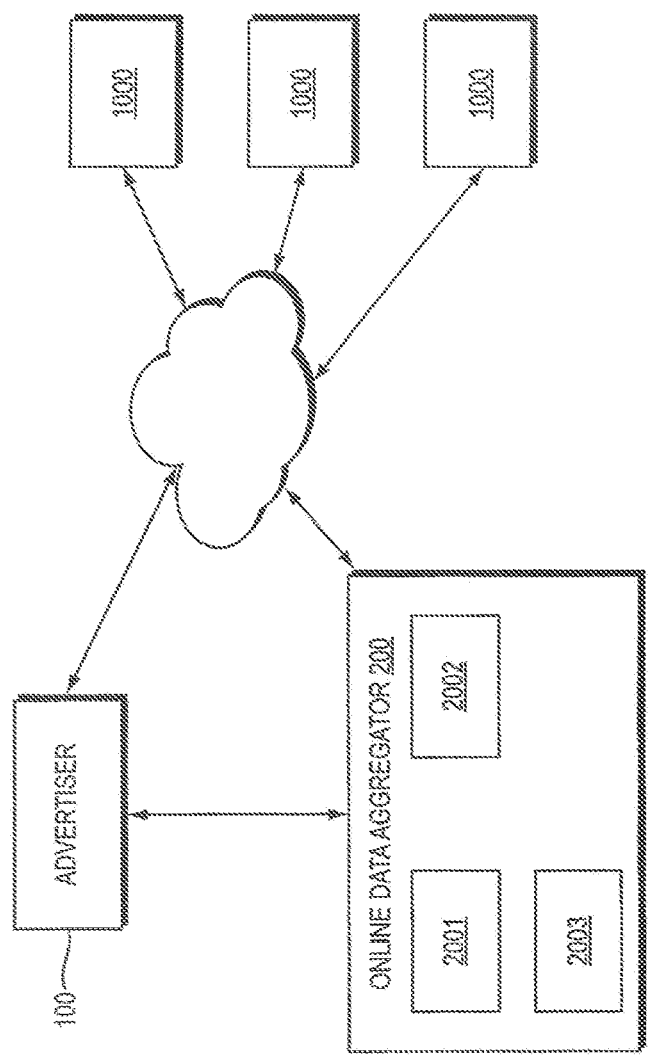
FIG. 1 illustrates system for use in accordance with an exemplary embodiment of the invention.

Referring to FIG. 1, a set of one or more consumer behaviors that are relevant to the business of an advertiser 100, such as online (i.e., Internet) activity ("visits www.my-brand.com") or offline behavior ("purchased a certain product in a store"), are identified by the advertiser 100 as a Target Characteristic. The Target Characteristic may be communicated by the advertiser 100 to the entity performing the analysis (e.g., the Online Data Aggregator 200) electronically or manually (e.g., in person, over the telephone) or by other convenient means.

A list of Internet user keys that are associated with the Target Characteristic ("Online Target List") is compiled from a computer database of online data ("Online Database") 2001 collected by an online advertising company or a company that is otherwise an aggregator of online data ("Online Data Aggregator") 200. The Online Database 2001 records include (1) a user key, such as a browser cookie, that is sufficient to distinguish between different internet users 1000 but does not personally identify the user and (2) data related to Internet browsing, such as the type of the browser, computer operating system, general geographic location of the internee connection, or internet site visitation history; records of online and offline purchases of the advertiser's products; other consumer and household information (e.g., search keywords, demographics etc.). The Target Characteristic data is either already contained in the Online Database 2001 or may be added or collected at the advertiser's request. If, for instance, the Internet site visitation history recorded in the Online Database 2001 does not include history of visitation to the advertiser's desired site, then the relevant data may be collected after the advertiser places a tracking pixel on the site, or by other means. The Online Target List is stored in a computer database ("Online Target Database") 2002. The Online Target Database 2002 may be part of the Online Database 2001, or may be a separate database, and may even be maintained by a separate entity.

The number of Internet users 1000 in the Online'Target List is counted using a computer program to determine the fixed audience size that, for the purposes of further analysis, represents the Online Target List ("Online Target Count").

The number of Internet users in the Online Database 2001 is counted using a computer program to determine a fixed audience size that, for the purposes of further analysis, represent the total online user population size ("Total Population"). The Total Population is assumed to be a representative population of some group that is relevant to the advertiser (for instance, the US population, the US internet audience, the US television audience, etc).

A set of one or more available media consuming behaviors (e.g., TV viewing behaviors) is defined as a set of media consuming behaviors comprising consuming (i.e., viewing, listening to or reading) individual shows, programs, websites or web content, or content on mobile devices, or print media. Thus, for example in the television environment, each available TV viewing behavior in the set might represent viewing of a single show. Alternatively, for example in the television environment, a set of available TV viewing behaviors may be defined as TV viewing behaviors comprising viewing of programs on certain TV channels, dayparts, or viewing of certain TV program categories, such as sports, comedy, etc., or viewing of other possible groups or combinations of groups of TV programs. In radio, print or other media environments, similar principles apply (e.g., each available radio listening behavior might represent listening to a particular program, or a set of available radio listening behaviors may be defined as radio listening behaviors comprising listening to programs on particular radio stations, or listening to programs specializing in particular musical genres). Each one of the available media consuming behaviors (e.g., TV viewing behaviors) is linked to Internet users via a list of user keys, e.g., a list of Internet browser cookies, that are associated with Internet users who are likely to exhibit the media consuming behavior ("Media Target List"). One way for determining the Media Target List in the television example is described in U.S. patent application Ser. No. 13/441,457, filed Apr. 6, 2012, the entirety of which is hereby incorporated by reference. The Media Target Lists are stored in a computer database along with information identifying the available media viewing behaviors ("Media Consumption Database") 203 (which may be separate or included as part of databases 2001 and/or 2002). The number of Internet users in each Media Target List is counted using a computer program to determine the fixed audience size that, for the purposes of further analysis, represents the Media Target List ("Media Target Count"). Table 1 provides an example in the television example.

TABLE 1

| Show | Media Target Count |
| --- | --- |
| Show A | 17,500,000 |
| Show B | 10,000,000 |
| Show C | 8,000,000 |
| Show D | 5,000,000 |

For each Media Target List in the Media Consumption Database that is relevant to the advertiser's commercial needs, a computer program matches the user keys in the Media Target List to the user keys in the Online Target List and counts the number of users that are part of both lists to determine the audience size that, for the purpose of further analysis, represents the intersection of the Media Target List and the Online Target List ("Joint Target Count").

An index determined, based on the aforementioned counts, and used to measure an incidence of the Target Characteristic in the Media Target List relative to an incidence of the Target Characteristic among Internet users whose data is contained in the database(s). The index can be determined in a number of different ways within the scope of the present invention. The following describes one exemplary way in which the index can be calculated.

In accordance with one exemplary way in which the index can be determined, a computer program performs a calculation to determine the incidence of the Target Characteristic within a Media Target List ("Media Incidence"). The calculation may be performed as follows:

Media Incidence=Joint Target Count/Media Target Count

Example: 10/10=1

In addition, a computer program performs a calculation to determine the incidence of the Target Characteristic within the Total. Population ("Total Incidence"). The calculation may be performed as follows:

Total Incidence=Online Target Count/Total Population

Example: 5/10=0.5

Using a computer program, the ratio of the Media Incidence to the Online Incidence is calculated in order to determine how much more or less frequent the occurrence of the Target Characteristic is within the Media Target List, relative to the Total Population (Coincidence Ratio). The calculation may be performed as follows:

Coincidence Ratio=(Media Incidence)/(Total Incidence)

Example: 1/0.5=2.0

Finally, the Coincidence Ratio, in order to be expressed in the form of an index, may be multiplied by 100 to yield the Media Target Index.

Media Target Index=Coincidence Ratio×100

Example: 2×100=200 Index

By way of further illustration, the interpretation of these figures would be that an index of 200 indicates that the Target Characteristic appears within the Media Target List audience at a rate twice as large as that observed in the total population and that an index of 75 indicates that the Target Characteristic occurs within the Media Target List audience at three-fourths of the rate observed in the total population.

The same calculations are then performed for additional Media Target Lists.

The resulting analysis may be expressed in terms of a comparative table, enabling an advertiser to compare the relative desirability of advertising in a particular media outlet, for example, during a TV show or list of TV shows, based on their concentration of an audience who exhibits the Target Characteristic. Table 2 provides an example.

TABLE 2

| Show | Index for "visits www.mybrand.com" |
| --- | --- |
| Show A | 200 |
| Show B | 115 |
| Show C | 90 |
| Show D | 65 |

Those skilled in the art will recognize that the index could be calculated based on the counts in other manners, such as multiplying the coincidence ratio by a different multiplier (e.g., 1000) or by not using a multiplier. Still further, a function other than taking a ratio of the aforementioned ratios could be used to determine the index. For example, a logarithm of the ratios could be used. All such methods of calculating the index based on the counts are within. the scope of the present invention.

The following provides an illustrative example of the systems and processes described herein. A brand advertiser, Advertiser A, is preparing to purchase TV advertising inventory from a television network, Network X. The two parties are negotiating the relative value of 20 Network X programs to Advertiser A. In order to ensure that the programs it purchases on Network X reach its target audience, Advertiser A requests an analysis of its program options of a service provider or an Online Data Aggregator 200. Advertiser A then supplies a definition of its Target Characteristic to the service provider or Online Data Aggregator 200 for instance, "visits www.advertiser-a.com." The service provider or Online Data Aggregator 200 performs a Coincidence Calculation for each of the 20 program options on Network X, ranking them in order based on the presence of visitors of www.advertiser-a.com as an indication of each program's appeal to Advertiser A's target audience. The service provider provides the analysis to Advertiser A, who is then equipped with intelligence that can either inform the programs on which Advertiser A purchases advertising or the value (and price) Advertiser A is willing to assign each program in its negotiation with Network X.

Figure 2:
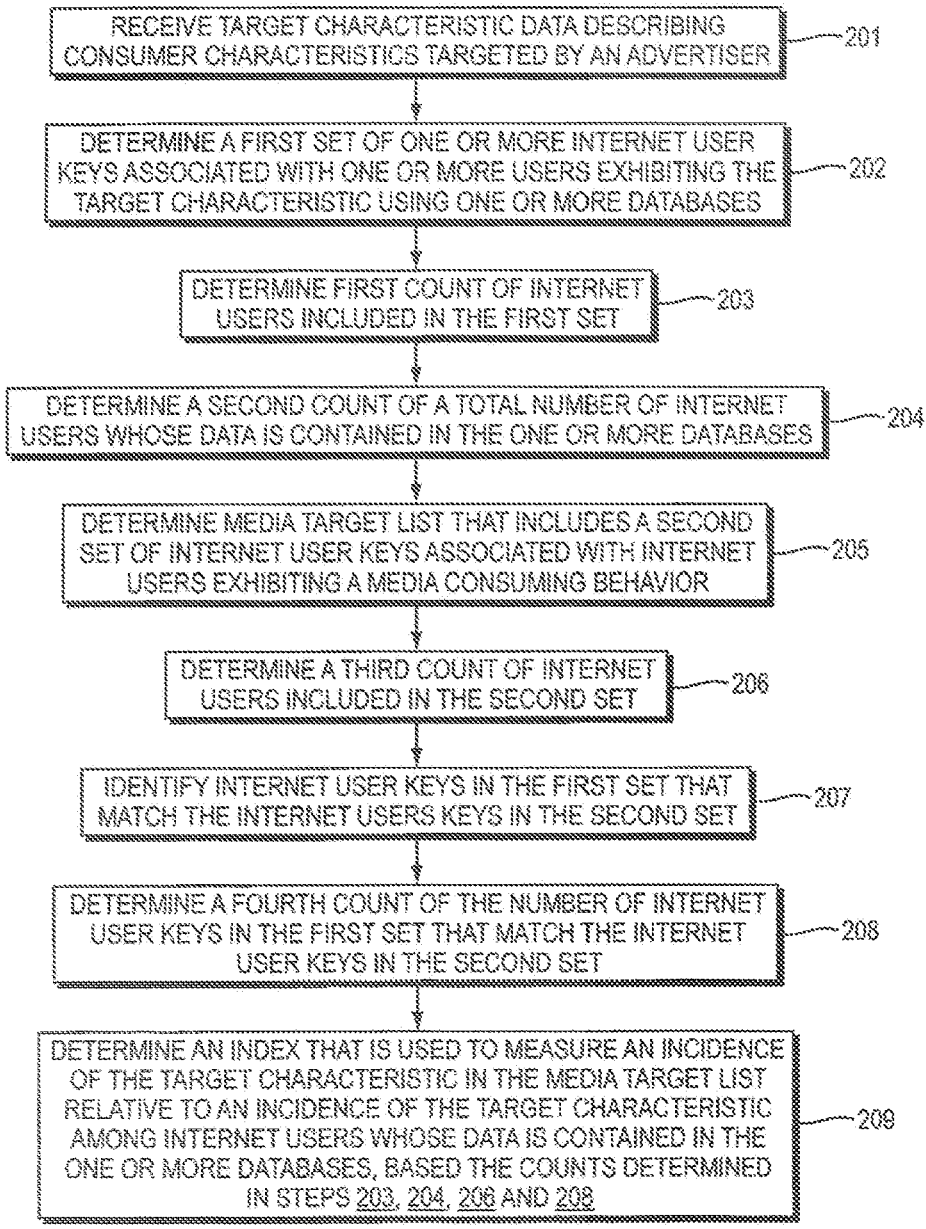
FIG. 2 illustrates an exemplary method for performing targeted advertising.
Figure 3:
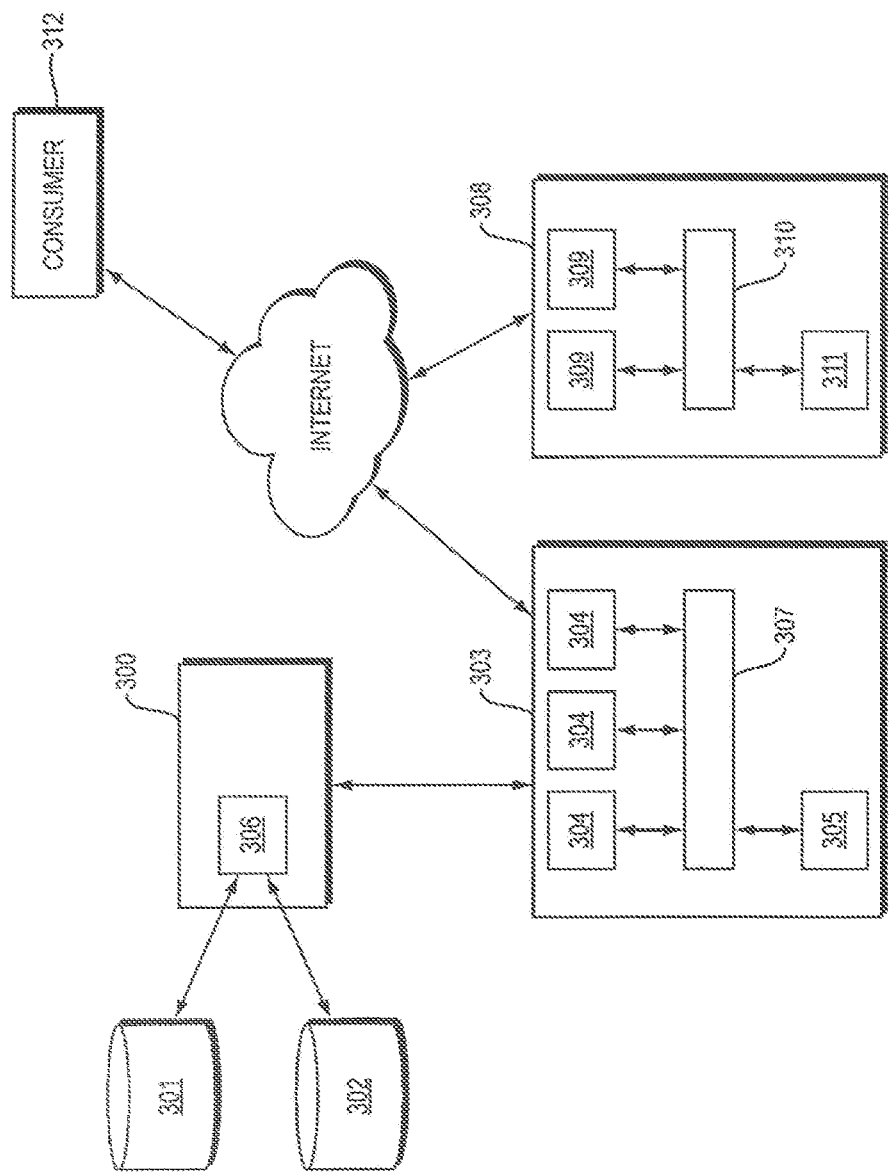
FIG. 3 illustrates exemplary computer hardware and software systems that may be used in connection with the present invention.

FIG. 2 illustrates an exemplary method that may be used to implement certain embodiments of the present invention. In step 201, target characteristic data describing consumer characteristics targeted by an advertiser is received. In step 202, a first set of one or more Internet user keys associated with one or more users exhibiting the target characteristic data is determined using one or more databases that store data describing a plurality of user keys and the target characteristic data associated with each of the plurality of user keys. In step 203, a first count of Internet users included in the first set is determined. In step 204, a second count of a total number of Internet users whose data is contained in the one or more databases is determined. In step 205, a media target list is determined. The media target list includes a second set of one or more Internet user keys associated with one or more Internet users exhibiting a media consuming behavior. In step 206, a third count of Internet users included in the second set is determined. In step 207, the Internet user keys in the first set that match the Internet users keys in the second set are identified. In step 208, a fourth count of the number of Internet user keys in the first set that match the Internet user keys in the second set is determined. In step 209, an index, used to measure an incidence of the target characteristic in the media target list relative to an incidence of the target characteristic among Internet users whose data is contained in the one or more databases, is determined based the counts determined in steps 203, 204, 206 and 208, Exemplary hardware and software employed by the systems are now generally described with reference to FIG. 3. Database server(s) 300 may include a database services management application 306 that manages storage and retrieval of data from the database(s) 301, 302. The databases may be relational databases; however, other data organizational structure may be used without departing from the scope of the present invention. One or more application server(s) 303 are in communication with the database server 300. The application server 303 communicates requests for data to the database server 300. The database server 300 retrieves the requested data. The application server 303 may also send data to the database server fir storage in the database(s) 301, 302. The application server 303 comprises one or more processors 304, computer readable storage media 305 that store programs (computer readable instructions) for execution by the processor(s), and an interface 307 between the processor(s) 304 and computer readable storage media 305. The application server may store the computer programs referred to herein.

To the extent data and information is communicated over the Internet, one or more Internet servers 308 may be employed. The Internet server 308 also comprises one or more processors 309, computer readable storage media 311 that store programs (computer readable instructions) for execution by the processor(s) 309, and an interface 310 between the processor(s) 309 and computer readable storage media 311. The Internet server 308 is employed to deliver content that can be accessed through the communications network, e.g., by consumer 312. When data is requested through an application, such as an Internet browser, the Internet server 308 receives and processes the request. The Internet server 308 sends the data or application requested along with user interface instructions for displaying a user interface.

The computers referenced herein are specially programmed to perform the functionality described herein as performed by the software programs. The programs described herein are, in one embodiment, executed on the systems of the Online Data Aggregator 200, of FIG. 1. However, other service providers may perform portions of the services and calculations described herein.

The non-transitory computer readable storage media may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system.

What is claimed is:

1. A system comprising:
   a data aggregator comprising at least one database server;
   a memory operable to store at least one program; and
   at least one processor communicatively coupled to the memory, in which the at least one program, when executed by the at least one processor, causes the at least one processor to:
   receive target browsing characteristic data describing media consumer characteristics targeted by an advertiser wherein target browsing characteristics included in the received data are selected by the advertiser;
   determine, at least from the received target browsing characteristic data, a first set of a plurality of user keys associated with one or more media consumers exhibiting the target browsing characteristic data linked with at least one media consuming behavior;
   determine a first count of users included in the first set;
   determine a second count of a total number of users whose data is contained in one or more databases of the data aggregator;
   determine a media target list, the media target list comprising a second set of a plurality of user keys associated with one or more users exhibiting a first media consuming behavior;

determine a third count of users included in the second set;

identify the user keys in the first set that match the user keys in the second set;

determine a fourth count of a number of user keys in the first set that match the user keys in the second set;

determine a first index value based at least in part on a ratio between an incidence of the target browsing characteristic in the media. target list and an incidence of the target browsing characteristic among users whose data is contained in the one or more data aggregator databases based on the first count, second count, third count and fourth count, wherein the first index value facilitates performing a comparison of a relative measure of targeting a particular set of users, with the target browsing characteristic, based at least in part on an index value determination of respective index values corresponding to a defined value applied to media consuming behavior connected to a media; and generate a table providing at least a list of media consumers associated with the media consuming behavior and within at least the first count, the second count, the third count, and the fourth count.

2. The system of claim 1, wherein the at least one program, when executed by the at least one processor, further causes the at least one processor to:

determine a second media target list, the second media target list comprising a respective set of one or more user keys associated with respective one or more users exhibiting a second media consuming behavior, wherein the second media consuming behavior is different than the first media consuming behavior;

determine a second index value based at least in part on a respective ratio between a respective incidence of the target browsing characteristic in the second media target list and the incidence of the target characteristic among users whose data is contained in the one or more databases based on the first count, second count, third count and fourth count;

determine a ranking of the first index value and the second index value; and generate a table including at least the first index value and the second index value based at least in part on the ranking, wherein the table is utilized for performing the comparison of the relative measure of targeting the particular set of users, with the target characteristic, among at least one media outlet.

3. The system of claim I, wherein each of the respective index values is based at least in part on the particular set of users that are associated with particular consumer characteristics included in the target browsing characteristic data for a respective media outlet.

4. The system of claim I. wherein the first index is based on a logarithm of the ratio between the incidence of the target browsing characteristic in the media target list and. the incidence of the target characteristic among users whose data is contained in the one or more databases based on the first count, second count, third count and fourth count.

5. A non-transitory computer-readable storage medium that stores instructions which, when executed by one or more processors, cause the one or more processors to perform a method comprising:

receive target browsing characteristic data describing media consumer characteristics targeted by an advertiser wherein target browsing characteristics included in the received data are selected by the advertiser;

determine, at least from the received target browsing characteristic data, a first set of a plurality of user keys associated with one or more media consumers exhibiting the target browsing characteristic data linked with at least one media consuming behavior;

determine a first count of users included in the first set;

determine a second count of a total number of users whose data is contained in one or more databases of a data aggregator;

determine a media target list, the media target list comprising a second set of a plurality of user keys associated with one or more users exhibiting a first media consuming behavior;

determine a third count of users included in the second set;

identify the user keys in the first set that match the user keys in the second set;

determine a fourth count of a number of user keys in the first set that match the user keys in the second set;

determine a first index value based at least in part on a ratio between an incidence of the target browsing characteristic in the media. target list and an incidence of the target browsing characteristic among users whose data is contained in the one or more data aggregator databases based on the first count, second count, third count and fourth count, wherein the first index value facilitates performing a comparison of a relative measure of targeting a particular set of users, with the target browsing characteristic, based at least in part on an index value determination of respective index values corresponding to a defined value applied to media consuming behavior connected to a media; and generate a table providing at least a list of media consumers associated with the media consuming behavior and within at least the first count, the second count, the third count, and the fourth count.

6. The medium of claim 5, wherein the instructions, when executed by the at least one processor, further causes the at least one processor to:

determine a second media target list, the second media target list comprising a respective set of one or more user keys associated with respective one or more users exhibiting a second media consuming behavior, wherein the second media consuming behavior is different than the first media consuming behavior;

determine a second index value based at least in part on a respective ratio between a respective incidence of the target browsing characteristic in the second media target list and the incidence of the target characteristic among users whose data is contained in the one or more databases based on the first count, second count, third count and fourth count;

determine a ranking of the first index value and the second index value; and generate a table including at least the first index value and the second index value based at least in part on the ranking, wherein the table is utilized for performing the comparison of the relative measure of targeting the particular set of users, with the target characteristic, among at least one media outlet.

7. The medium of claim 5, wherein each of the respective index values is based at least in part on the particular set of users that are associated with particular consumer characteristics included in the target browsing characteristic data for a respective media outlet.

8. The medium of claim 5, wherein the first index is based on a logarithm of the ratio between the incidence of the target browsing characteristic in the media target list and the incidence of the target characteristic among users whose data is contained in the one or more databases based on the first count, second count, third count, and fourth count.

9. A computer-implemented method, comprising:
receiving target browsing characteristic data describing media consumer characteristics targeted by an advertiser wherein target browsing characteristics included in the received data are selected by the advertiser;
determining, at least from the received target browsing characteristic data, a first set of a plurality of user keys associated with one or more media consumers exhibiting the target browsing characteristic data linked with at least one media consuming behavior;
determining a first count of users included in the first set;
determining a second count of a total number of users whose data is contained in one or more databases of a data aggregator;
determining a media target list, the media target list comprising a second set of a plurality of user keys associated with one or more users exhibiting a first media consuming behavior;
determining a third count of users included in the second set;
identifying the user keys in the first set that match the user keys in the second set;
determining a fourth count of a number of user keys in the first set that match the user keys in the second set;
determining a first index value based at least in part on a ratio between an incidence of the target browsing characteristic in the media target list and an incidence of the target browsing characteristic among users whose data is contained in the one or more data aggregator databases based on the first count, second count, third count and fourth count, wherein the first index value facilitates performing a comparison of a relative measure of targeting a particular set of users, with the target browsing characteristic, based at least in part on an index value determination of respective index values corresponding to a defined value applied to media consuming behavior connected to a media; and
generating a table providing at least a list of media consumers associated with the media consuming behavior and within at least the first count, the second count, the third count, and the fourth count.

10. The method of claim 9, further comprising:
determining a second media target list, the second media target list comprising a respective set of one or more user keys associated with respective one or more users exhibiting a second media consuming behavior, wherein the second media consuming behavior is different than the first media consuming behavior;
determining a second index value based at least in part on a respective ratio between a respective incidence of the target browsing characteristic in the second media target list and the incidence of the target characteristic among users whose data is contained in the one or more databases based on the first count, second count, third count and fourth count;
determining a ranking of the first index value and the second index value; and
generating a table including at least the first index value and the second index value based at least in part on the ranking, wherein the table is utilized for performing the comparison of the relative measure of targeting the particular set of users, with the target characteristic, among at least one media outlet.

11. The method of claim 9, wherein each of the respective index values is based at least in part on the particular set of users that are associated with particular consumer characteristics included in the target browsing characteristic data for a respective media outlet.

12. The method of claim 9, wherein the first index is based on a logarithm of the ratio between the incidence of the target browsing characteristic in the media target list and the incidence of the target characteristic among users whose data is contained in the one or more databases based on the first count, second count, third count and fourth count.

* * * * *

UNITED STATES PATENT AND TRADEMARK OFFICE
CERTIFICATE OF CORRECTION

PATENT NO. : 11,887,158 B2
APPLICATION NO. : 17/538607
DATED : January 30, 2024
INVENTOR(S) : Evans et al.

Page 1 of 2

It is certified that error appears in the above-identified patent and that said Letters Patent is hereby corrected as shown below:

In the Specification

In Column 1, Line 28, delete "keys," and insert --keys.-- therefor

In Column 1, Line 31, delete "in." and insert --in-- therefor

In Column 1, Line 32, delete "deter ruined." and insert --determined.-- therefor In Column 2, Line 55, delete "internee" and insert --internet-- therefor In Column 3, Line 3, delete "Online'Target" and insert --Online Target-- therefor In Column 4, Line 20, delete "Total." and insert --Total-- therefor In Column 5, Line 1, delete "within." and insert --within-- therefor In Column 5, Line 13, delete "for" and insert -- —for-- therefor In Column 5, Line 52, delete "208," and insert --208.-- therefor In Column 5, Line 65, delete "fir" and insert --for-- therefor In the Claims In Column 7, Line 9, In Claim 1, delete "media." and insert --media-- therefor In Column 7, Line 49, In Claim 3, delete "claim I," and insert --claim 1,-- therefor In Column 7, Line 54, In Claim 4, delete "claim I." and insert --claim 1,-- therefor Signed and Sealed this
Thirty-first Day of December, 2024

Derrick Brent
*Acting Director of the United States Patent and Trademark Office*

In Column 7, Line 56, In Claim 4, delete "and." and insert --and-- therefor

In Column 8, Line 23, In Claim 5, delete "media." and insert --media-- therefor